United States Patent [19]
French

[11] 3,813,115
[45] May 28, 1974

[54] PLASTIC PIPE THRUST RESISTANT JOINT

[75] Inventor: David Walter French, Denison, Tex.

[73] Assignee: Johns-Manville Corporation, Greenwood Village, Colo.

[22] Filed: Oct. 27, 1972

[21] Appl. No.: 301,552

[52] U.S. Cl.................... 285/92, 285/355, 285/391
[51] Int. Cl............................................ F16l 15/00
[58] Field of Search ............. 285/92, 355, 391, 423, 285/81, 360, 361, 81; 151/14 R, 22, 7; 403/320

[56] References Cited
UNITED STATES PATENTS

| 755,325 | 3/1904 | Soutar............................ 285/347 X |
| 2,049,290 | 7/1936 | Burns et al...................... 285/391 X |
| 2,565,547 | 8/1951 | Collins................................... 285/3 |
| 2,673,751 | 3/1954 | Finch................................ 285/391 X |
| 3,013,820 | 12/1961 | Pouppirt............................. 285/355 |
| 3,435,978 | 4/1969 | Wittmer........................ 151/14 R X |
| 3,633,944 | 1/1972 | Hamburg............................. 285/81 |

FOREIGN PATENTS OR APPLICATIONS 1,211,043  2/1966  Germany .......................... 285/355

847,025   9/1960   Great Britain ....................... 285/92

Primary Examiner—Thomas F. Callaghan
Attorney, Agent, or Firm—Robert M. Krone; Stephen C. Shear

[57] ABSTRACT

A bell and spigot joint for connecting two pipes together is disclosed herein. The joint, which is especially suitable as a thrust resistant joint, includes a bell end having at least one helical groove or at least partially helical groove integrally formed at least partially around its internal surface and a spigot having at least one outwardly protruding and at least partial helical rib integrally formed around its external surface. The rib is adapted to cooperate with the aforementioned helical groove for connecting the bell end and spigot together in a reliable threaded fashion. In addition, the bell and spigot joint includes a locking arrangement for securing the bell end and spigot together once the latter are joined in the aforestated threaded fashion.

9 Claims, 8 Drawing Figures

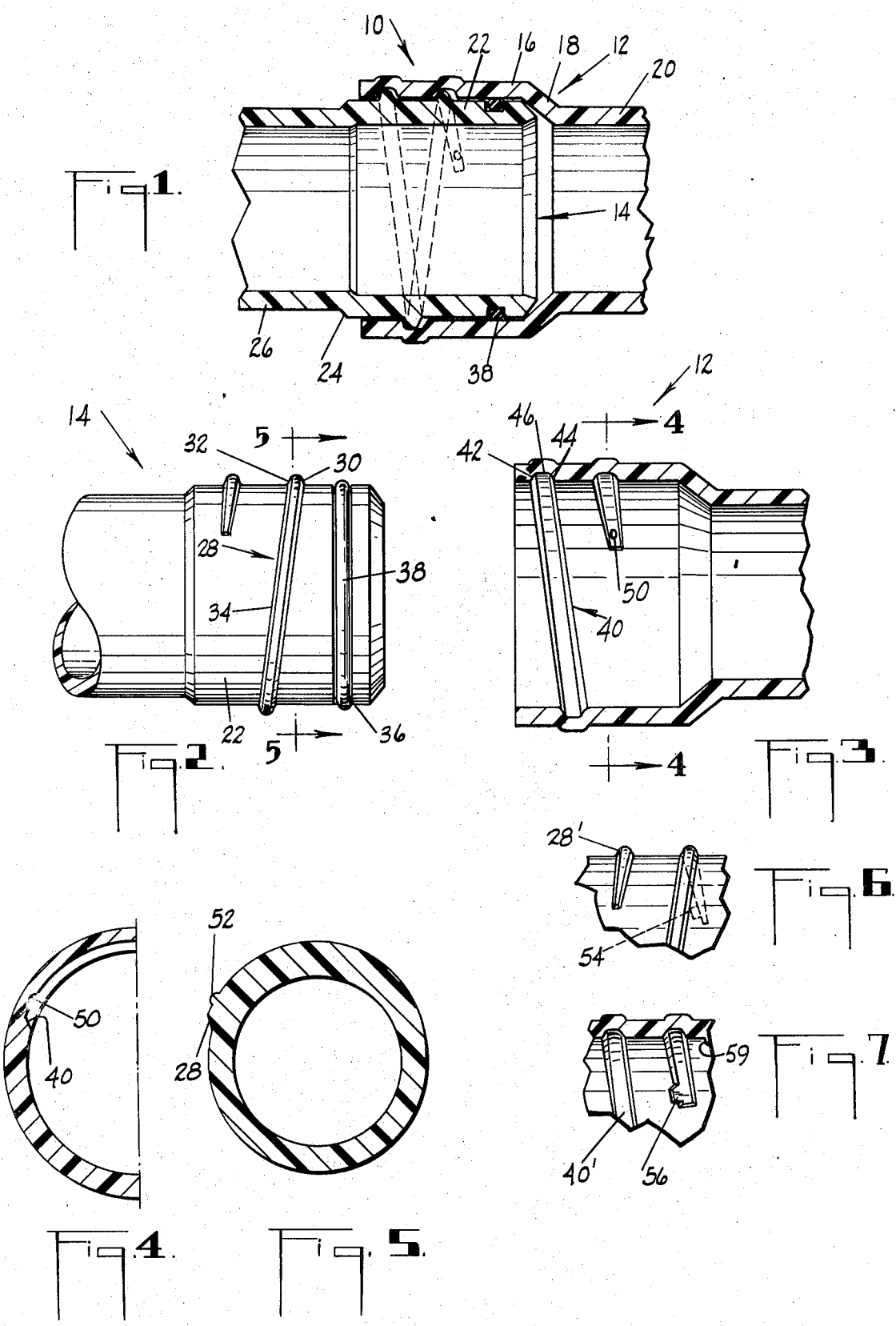

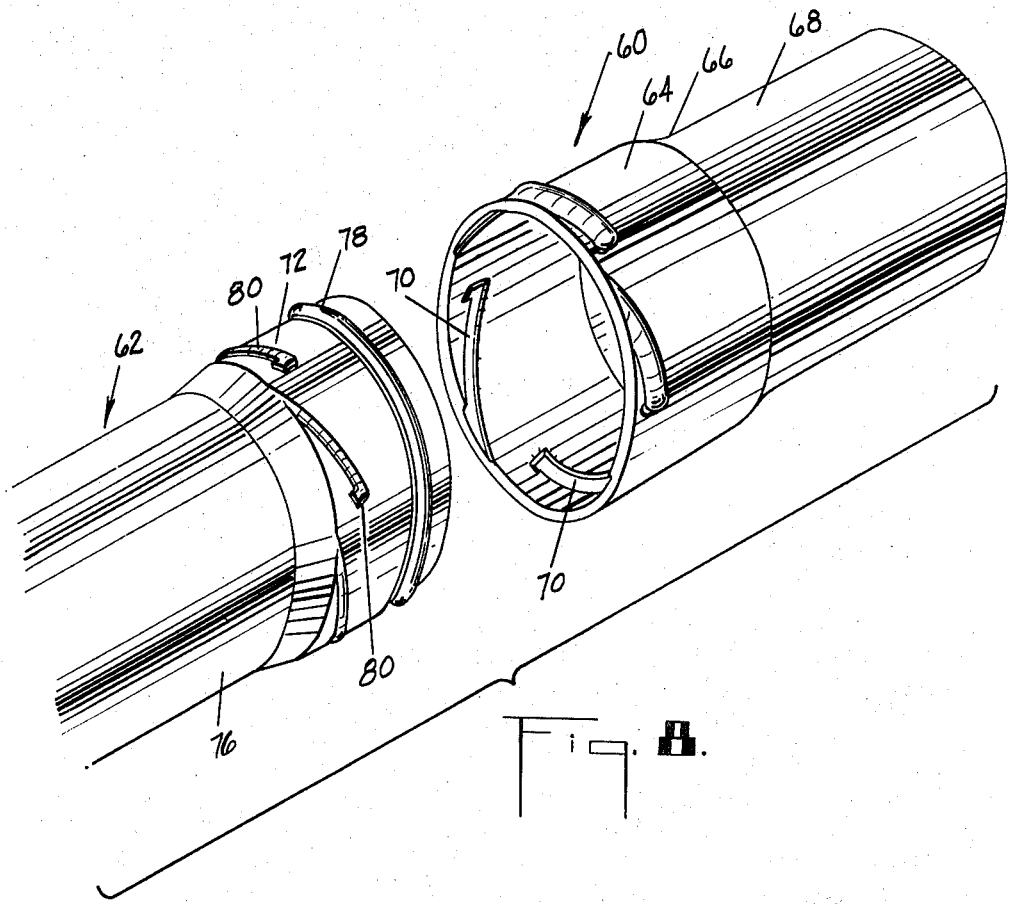

PLASTIC PIPE THRUST RESISTANT JOINT

BACKGROUND OF THE INVENTION

The present invention relates generally to an assembly for connecting two pipes together and more particularly to a bell and spigot joint which resists uncoupling when subjected to thrust or other such forces.

Today, there are many methods of joining plastic pipe. Two plastic pipes may be joined together by, for example, either a bell and spigot or coupling, each of which may include a rubber ring joint, crimp squeeze joint or fusion weld joint. While it has been found that the rubber ring joint provides many advantages over other suitable fastening or joining means, such a joint has, heretofore, provided little resistance to joint separation under opposing lateral forces such as internal or external thrust force as well as forces due to shrinkage, changes in temperature or the like. Hence, heretofore, rubber ring joints have, in many cases, required additional means to aid in resisting these forces. For example, where the pipe arrangement carries fluid under pressure, thrust forces often result at the joint where the pipe changes directions. In many cases, cement thrust resisting blocks or other suitable means are required to prevent the possibility of uncoupling at this joint due to the resultant thrust forces.

As will be seen hereinafter, the present invention provides a joint for connecting two plastic pipes together such that the joint is highly resistant to thrust forces or other forces otherwise tending to cause undesired uncoupling. In addition, the joint configuration of the present invention may preferably utilize a rubber ring, thereby providing the inherent advantages attached thereto.

OBJECTS AND SUMMARY OF THE INVENTION

In accordance with the foregoing, an object of the present invention is to provide a plastic pipe joint configuration which displays improved resistance to disassembly.

Another object of the present invention is to provide a joint configuration of the last-mentioned type in which a sealing gasket may be utilized to provide proper sealing at the joint.

Yet another object of the present invention is to provide a plastic pipe connecting joint configuration with improved locking means to secure the joint in place.

Still another object of the present invention is to provide a joint configuration which provides an uncomplicated way of coupling and uncoupling two plastic pipes together.

The foregoing objects are attained and many defficiencies of the prior art are overcome by the present invention which is directed to a novel and yet uncomplicated joint configuration adapted to securely couple two plastic pipes together and provide improved thrust resistance or other such uncoupling resistance at the joint. In addition, the joint configuration of the present invention provides a rather expedient method of both coupling and uncoupling two pipes and yet, at the same time, providing reliable means for self-locking the joint in place.

The foregoing is preferrably achieved by the utilization of a bell and spigot joint configuration. As will be seen hereinafter, the bell end of the configuration includes a uniquely designated continuous helical groove or a plurality of grooves preferably integrally formed around its internal surface. The spigot on the other hand, includes a complementary continuous helical rib or a plurality of complementary ribs formed around its external surface and adapted to cooperate with the helical groove or grooves of the bell end for securely coupling the bell end and spigot together. In this regard, the helical groove and helical rib or grooves and ribs are carefully designated to provide improved uncoupling resistance to the joint as well as uniquely designated cooperating means to lock the two components of the joint configuration together.

These and other objects and features of the present invention will become apparent from the following descriptions.

DESCRIPTION OF THE DRAWINGS

FIG. 1 is a side cross-sectional view of a bell and spigot joint configuration constructed in accordance with the present invention.

FIG. 2 is a side view of the spigot constructed in accordance with the present invention.

FIG. 3 is a side cross-sectional view of the bell end constructed in accordance with the present invention.

FIG. 4 is a sectional view taken generally along line 4—4 in FIG. 3.

FIG. 5 is a sectional view taken generally along line 5—5 in FIG. 2.

FIG. 6 is a broken away sectional view illustrating a modification to the spigot of FIG. 2.

FIG. 7 is a broken away sectional view illustrating a modification to the bell end of FIG. 3.

FIG. 8 is a perspective view of a modified bell end and spigot designed in accordance with a preferred embodiment of the present invention.

DETAILED DESCRIPTION

Turning now to the drawings, where like components are designated by like reference numerals throughout the various figures, a bell and spigot joint which is constructed in accordance with the present invention and which is provided for coupling two pipes together, is illustrated in FIG. 1 and generally designated by the reference numeral 10. Joint 10 includes a bell end 12 and a spigot end 14, each of which is preferably formed from an end section of a pipe constructed of a heat deformable material such as, for example, polyvinyl chloride or other plastic material.

As illustrated in FIG. 1, bell end 12 includes an enlarged bell shaped sleeve 16 which tapers inwardly at 18 and merges with the undeformed section 20 of the pipe. In a similar manner, and for reasons to be described hereinafter, spigot 14 includes a slightly enlarged end section 22 which tapers inwardly, again slightly, at 24 and merges with the undeformed section 26 of its associated pipe. In this regard, it should be noted that the outer diameter of enlarged end section 22 and enlarged bell sleeve 16 are chosen such that the spigot fits closely but slidably into the enlarged bell sleeve.

Turning to FIG. 2, attention is directed to spigot 14 which, in accordance with one embodiment of the present invention, includes a continuous helical rib 28 formed preferably integrally with and protruding out from the external surface of enlarged end section 22. As shown, the rib travels or winds from a front end portion of the enlarged end section around the end section in a direction away from the free end of the latter. In this regard, while the rib is shown to make slightly greater than one turn, a greater or lesser number of turns may be provided depending upon the axial length of the bell and spigot joint as well as the strength required to maintain the bell end and spigot coupled together.

In accordance with one feature of the present invention helical rib 28, as illustrated best in FIG. 2, is defined by a front or forward most sidewall or shoulder 30, back or rearward most sidewall or shoulder 32 and a top wall 34 interconnecting the sidewalls at the outer most points thereof. Each of the sidewalls, and particularly rearward most sidewall 32, preferably extends outwardly from the external surface of spigot sleeve 22 at an angle between approximately 30° and approximately 90° with respect to the external surface of the spigot. In a working embodiment the angle has generally been between 35° and 45°. Hence, the sidewalls or shoulders provide rather sharp profiles with respect to the external surface of the spigot. As will be seen hereinafter, this sharp profile enhances uncoupling resistance of the bell and spigot joint to thrust or other forces tending to pull the joint apart.

In addition to rib 28, spigot 14 may include an annular groove 36 formed in its external surface and located between the forward most end of rib 28 and the free end of the spigot. As illustrated in FIG. 2, the annular groove is provided for receiving an annular sealing gasket 38 constructed of rubber or other such resilient material. A major factor for providing the gasket around the spigot rather than conventionally providing it within the bell end is that groove 36 is more easily formed around the spigot, especially when using a hydroforming process.

The gasket which extends slightly outwardly from the external surface of the spigot is compressed radially inwardly by the internal wall surface of enlarged bell sleeve 16 when the bell and spigot are coupled together, as illustrated best in FIG. 1. In this manner, the gasket provides a fluid and/or dust seal at the joint. In this regard, as best illustrated in FIG. 1, it should be noted that the inner most points of annular groove 36 define a diameter equal to the outer diameter of undeformed section 26. This, of course, is made possible because of slightly enlarged end section 22 of the spigot 14. Hence, if the gasket 38 were disposed around undeformed section 26, it would protrude outwardly therefrom a distance equal to the protruding distance when the gasket is disposed within groove 36. Therefore, in the unlikely event that spigot 14 must be removed from the undeformed section of the pipe, gasket 38 could be positioned around the undeformed section for providing the same gasket sealing capability as provided by the spigot.

Turning to FIG. 3, attention is directed specifically to bell end 12 which, as illustrated, includes a continuous helical groove 40 formed, preferably intergrally so, around the internal surface of the enlarged sleeve 16 and designed to receive rib 28 in a threaded fashion. In this regard, and also in accordance with the present invention, groove 40 is defined by front or forward most sidewall 42, back or rearward most sidewall 44 and a top wall 46 joining the two sidewalls. Each of the sidewalls, and particularly forward most sidewall 42, preferably extends inwardly from the internal surface of enlarged sleeve 16 at an angle of approximately 30° to approximately 90° with respect to the internal surface of the enlarged sleeve. In a working embodiment the angle has generally been between 35° and 45°. Hence, each of these sidewalls, like the sidewalls or shoulders of rib 28, provides a rather sharp profile with the internal surface of the bell sleeve.

Spigot 14 and bell end 12 are coupled together by thread screwing the rib 28 of the spigot into the cooperating groove 40 of the enlarged bell sleeve 16, as best illustrated in FIG. 1. As seen in this figure, when the bell end and spigot are coupled together, the rearward most shoulder 32 of rib 28 is located adjacent the forward most sidewall of groove 40. Hence, at least a portion of the shoulder and at least a portion of the sidewall will engage or abut against one another in response to axial forces such as, for example, internal thrust forces otherwise tending to pull the joint apart. In this regard, since both the shoulder 32 and sidewall 42 are designed with the aforedescribed sharp profile, resistance to these forces is enhanced.

Attention is now directed to FIGS. 4 and 5 in conjunction with FIGS. 2 and 3. As shown particularly in FIG. 4, the rearward most end of groove 40 includes a recess 50 extending further into enlarged bell sleeve 16 than the groove itself. On the other hand, a dimple or raised portion 52 which is designed to fit snugly within recess 50 is formed, preferably integrally so, on the forward most end of the rib, as best illustrated in FIG. 5. Hence, when the helical rib 28 of the spigot 14 is threaded into helical groove 40 of bell end 12 and, as the forward most end of the rib approaches the rearward most end of the groove, the dimple 52 will snap into recess 50 for selflocking the bell end and spigot together and thereby requiring a greater amount of twisting force in order to uncouple the two. In this regard, more than one recess may be provided along these grooves. Further, the dimple is of course at least slightly resilient so that it can travel along the groove before snapping into place. In addition, the entire surface surrounding the dimple tends to flex slightly to provide this traveling movement.

For a modified but preferred embodiment of the selflocking feature for bell and spigot joint 10, attention is directed to FIGS. 6 and 7. FIG. 6 shows a rib 28′, however, without dimple 52. Instead, a hook member 54 is formed, preferably integrally so, with the external surface of spigot 14 and extends outwardly therefrom. The hook member, as illustrated in FIG. 6, is directed from the forward most end of the rib in a direction away from the spigot's free end. FIG. 7 on the other hand, shows a groove 40′, however, without recess 50. In place of the recess, a slot or undercut portion 56 is formed in the internal surface of enlarged bell sleeve 16 and extends from the rearward most end of the groove towards the free end of the bell end. The slot is designed to receive hook member 54 in a close fitting fashion. In this regard, the width of rib 28′ is substantially less than the width of groove 40′, as illustrated in FIGS. 6 and 7. The hook, on the other hand, is designed to thread fit within groove 40′, thereby allowing threaded movement within the groove. In addition, the hook and slot are designed such that, at most, the end of the former barely touches the end of the latter when the slot receives the hooks. In this manner, the adjacent side walls of the groove and rib are capable of engaging one another.

During assembly of the bell end and spigot, the leading or forward most end of modified rib 28' including hook 54 will follow the helical groove in the bell end. The bell end and spigot may be designed so that the annular gasket 38 is compressed against an annular internal shoulder 59 provided in bell end 12 during assembly. The shoulder 59, as illustrated in FIG. 7, is formed between the inner most end of groove 40' and the tapering section of the bell end. At this time, hook member 54 and slot or undercut portion 56 will align with one another and the compressed gasket will act as a spring to snap the hook member into the slot, thereby locking the bell end and spigot together. In order to uncouple the bell end and spigot, the latter must first be forced further into the bell end and at the same time twisted so as to free the hook from the slot. Hence, a positive locking feature is achieved. The bell end and spigot may be of such dimensions so as to eliminate compression of gasket 38. In this case, forces such as thrust forces tending to pull the bell end and spigot apart will cause the hook member 54 to snap into the undercut portion 56.

Attention is now directed to FIG. 8 which illustrates a preferred embodiment of a polyvinyl chloride or other such plastic bell end and spigot, generally designated by the reference numeral 60 and 62, respectively. As shown in FIG. 8, bell end 60, like previously described bell end 12, includes an enlarged bell sleeve 64 which tapers inwardly at 66 and merges with the undeformed pipe section 68. However, unlike bell end 12, bell end 60 includes four separate internal helical grooves 70, each of which defines approximately one-quarter of a turn and each of which preferably includes sidewalls of sharp profile similar to those described with respect to groove 40. As illustrated, the grooves 70 are preferably equally circumferentially spaced around the internal surface of enlarged sleeve 64 and wind inwardly from the free end thereof.

Spigot 62, like aforedescribed spigot 14, includes an enlarged end section 72 adapted to slidably engage within enlarged sleeve 64, an inwardly tapering section 74 which merges with the undeformed portion 76 of the pipe and an annular external recess adapted to reserve an annular gasket 78 of suitable resilient material. However, unlike spigot 14, spigot 62 includes four external ribs 80 which are adapted to thread fit within respective grooves 70 as the spigot 62 is inserted and simultaneously twisted within bell end 60. In this regard, each of the ribs 80 includes shape profile shoulders similar to those of the rib 28 described with respect to spigot 14. Hence, grooves 70 and ribs 80 cooperate in the same manner as groove 40 and rib 28.

It is to be understood that the forward most end of each rib 80 and the rearward most end of each groove 70 may respectively include a dimple and cooperating recess similar to those previously described or a hook and cooperating under cut portion similar to those previously described. With the latter, bell end 60 may include an internal shoulder (not shown) similar to shoulder 59. In this manner, the bell end and spigot illustrated in FIG. 8 provide the same self-locking features described with respect to bell and spigot joint 10.

From the foregoing, it should be readily apparent that the present invention provides an uncomplicated and self-locking joint configuration which provides reliable coupling and resistance to forces otherwise tending to uncouple the joint.

What I claim is:

1. A plastic pipe arrangement comprising:
   a. a first plastic pipe having an end portion and a helical groove integrally formed in the internal surface of said end portion;
   b. a second cooperating plastic pipe having an end portion with an outer diameter slightly less than the inner diameter of said end portion of said first plastic pipe, said end portion of said second plastic pipe including a helical rib integrally formed on and protruding outwardly from its external surface and having a width which is substantially less than the width of said helical groove, said helical rib being adapted to cooperate with said helical groove of said first plastic pipe for connecting said plastic pipes together in a threaded fashion; and
   c. said groove and said rib including cooperating means for locking said plastic pipes together once the latter are threaded together said locking means including a locking slot formed in the inside surface of said first plastic pipe and extending from the rearward most end of said helical groove towards the forward most end thereof, a cooperating raised hook portion located at the forward most end of said helical rib and extending from the forward most end of said rib away therefrom, said raised portion and slot cooperating with one another after said pipes have been threaded together so as to interlock the pipes to one another and means for forcing said hook portion into said locking slot after said pipes have been threaded together, said forcing means including a gasket disposed within a groove formed around said second plastic pipe and an annular shoulder formed in the internal surface of said first plastic pipe, said gasket compressing against said shoulder when said pipes are threaded together so that said compressed gasket forces said hook portion into said slot portion.

2. A plastic pipe arrangement according to claim 1 wherein said helical groove includes a forward most side wall extending into said first plastic pipe at an angle between approximately 30° and approximately 90° with respect to the internal surface of said first plastic pipe, at least a portion of said side wall providing a reliable shear resistant surface against which said helical rib is adapted to abut in response to longitudinal force tending to pull said pipes away from one another, once the latter are threaded together.

3. A plastic pipe arrangement according to claim 2 wherein said helical rib includes a rearward most shoulder extending outwardly from the external surface of said second plastic pipe at an angle between approximately 30° and approximately 90° with respect to the external surface of said second plastic pipe, at least a portion of said shoulder being adapted to abut against the side wall of said groove in response to said longitudinal forces.

4. A plastic pipe arrangement according to claim 1 wherein:
   a. the end portion of said first plastic pipe includes a plurality of helical grooves similar to said first-mentioned groove;
   b. the end portion of said second plastic pipe includes an equal plurality of helical ribs similar to said first-mentioned helical rib and adapted to cooperate with said helical grooves, respectively, for connecting said plastic pipes together in a threaded fashion; and c. each cooperating groove and rib includes said locking means.

5. A plastic pipe arrangement according to claim 4 wherein the end portions of said pipe sections include four pairs of said cooperating grooves and ribs, said pairs being equally circumferentially spaced apart around said end portions.

6. A bell and spigot joint for connecting two pipes together, said joint comprising:

a. a bell end having at least one helical groove formed in its internal surface and directed inwardly from its free end and an inwardly protruding annular shoulder spaced longitudinally inwardly from said groove, said groove including a forward most side wall extending into said bell end at an angle between approximately 30° and approximately 90° with respect to the internal surface of said bell end;

b. a spigot having at least one outwardly protruding helical rib formed on its external surface, directed inwardly from its free end and adapted to cooperate with said helical groove of said bell end for connecting the bell end and spigot together in a threaded fashion, said rib including a rearward most shoulder extending outwardly from the external surface of said spigot at an angle between approximately 30° and approximately 90° with respect to the external surface of said spigot, said shoulder being adapted to abut against said side wall of said helical groove in response to longitudinal forces tending to pull said bell end and spigot away from one another once the latter are threaded together; and c. means for locking said bell end and spigot together once the latter are joined together in said threaded fashion, said locking means including a locking slot formed in the internal surface of said bell end and extending from the rearward most end of said helical groove towards the outermost end thereof, a cooperating raised hook portion located adjacent the forward most end of said helical rib and adapted to engage within said locking groove after said bell end and spigot have been connected together in said threaded fashion and means for forcing said raised portion into said locking groove after said bell end and spigot have been threaded together, said forcing means including a resilient annular gasket positioned within a circumferential groove formed around the external surface of said spigot, said gasket cooperating with the inwardly protruding shoulder of said bell end for forcing the raised portion of said locking hook into said locking slot.

7. A bell and spigot joint according to claim 6 wherein said bell end includes four helical grooves substantially equally circumferentially spaced about the internal surface of said bell end and wherein said spigot includes four helical ribs substantially equally circumferentially spaced about the external surface of said spigot.

8. A plastic pipe arrangement comprising:

a. a first plastic pipe section having an end portion, at least one helical groove formed in the internal surface of said end portion and a slot formed in the internal surface of said end portion and extending from a predetermined point at said groove toward the forward most end of said end portion;

b. a second cooperating plastic pipe section having an end portion with an outer diameter slightly less than the inner diameter of said end portion of said first plastic pipe section, said end portion of said second plastic pipe section including at least one helical rib integrally formed on and protruding outwardly from its external surface, said helical rib being adapted to cooperate with said helical groove of said first plastic pipe section for connecting said pipe sections together in a threaded fashion and a raised hook portion located at a predetermined point along said rib and extending away from the forward most end of the end portion of said second section, said hook portion and slot being adapted to mate with one another after said pipe sections have been threaded together so as to interlock said sections to one another; and c. means for automatically forcing said pipe sections longitudinally away from one another after said sections have been threaded together whereby to cause said slot and raised hook to mate with one another, said means also providing a seal between said pipe sections.

9. A plastic pipe arrangement comprising:

a. a first plastic pipe section having an end portion including an inner surface and an outer surface;

b. a second plastic pipe section having an end portion including an inner surface and an outer surface, said end portion of said second pipe section having an outer diameter slightly less than the inner diameter of the end portion of said first pipe section;

c. means for thread connecting said pipe sections together, said means including i. at least one helical groove formed in a preselected one of said inner and outer surfaces of the end portion of a preselected one of said pipe sections, ii. at least one helical rib integrally formed on and protruding from a preselected different one of said inner and outer surfaces of the end portion of the other one of said pipe sections, d. said preselected surfaces being chosen and said helical groove and helical rib being shaped such that said rib is adapted to cooperate with said groove for connecting said pipe sections together in a threaded fashion;

e. said preselected pipe section including said helical groove further including a slot formed in the same preselected surface as said groove and extending from a predetermined point at said groove toward the forward most end of the end portion associated with said groove;

f. said preselected pipe section including said helical rib further including a protruding hook portion located at a predetermined point along said rib and extending away from the forward most end of the end portion associated with said rib, said hook portion and slot being adapted to mate with one another after said pipe sections have been threaded together so as to interlock said sections to one another; and g. means for automatically forcing said pipe sections longitudinally away from one another after said sections have been threaded together, whereby to cause said slot and hook portion to mate with one another, said means also providing a seal between said pipe sections.

* * * * *